United States Patent Office 3,567,628
Patented Mar. 2, 1971

3,567,628
PRODUCTION OF HIGH FLASH POINT TOPPED CRUDE AND HIGH FLASH POINT ASPHALT
Joe Van Pool, Bartlesville, Okla., assignor to Phillips Petroleum Company
Filed Oct. 25, 1968, Ser. No. 770,575
Int. Cl. B01d 3/32, 3/42; C10g 7/00
U.S. Cl. 208—355            4 Claims

ABSTRACT OF THE DISCLOSURE

A high flash point reduced crude oil and a high flash point specification asphalt are produced by first distilling a crude oil in a distillation operation practiced in a distillation zone having a fractionation section and a stripping section in which a lower portion of the fractionation section is maintained at the highest temperature in the overall operation and to which is passed crude oil heated to substantially said highest temperature. A portion of distillate taken from said lower portion of said fractionation section is admixed with the crude oil and heated together therewith and therefore, reintroduced into the operation. The heated crude oil is, in any event, introduced intermediate the fractionation section and the stripping section. Alternately, distillate in the lower portion of the fractionation section can be heated therein to the desired highest temperature or substantially highest temperature in the overall operation. There is avoided the passing of distillate produced in or reintroduced into the operation to the stripping section by removing gas oil from a point above said lower portion of said fractionation section responsive to liquid level in said lower portion of said fractionation section. A trap-out tray from which the distillate is removed and passed to the furnace is operated so as to prevent overflow of distillate therefrom into the stripping section. A level controller on the trap-out tray regulates the rate of removal of gas oil from the fractionation section so as to insure production of desired reflux in the lower portion of the fractionation section. A high flash point reduced crude is withdrawn from the lower portion or bottom of the stripping section. Fractions boiling lower than the gas oil are taken off from the upper portions of the fractionation section. The reduced crude oil is solvent extracted as by a propane extraction operation to produce specification high flash point asphalt.

---

Figure 1:
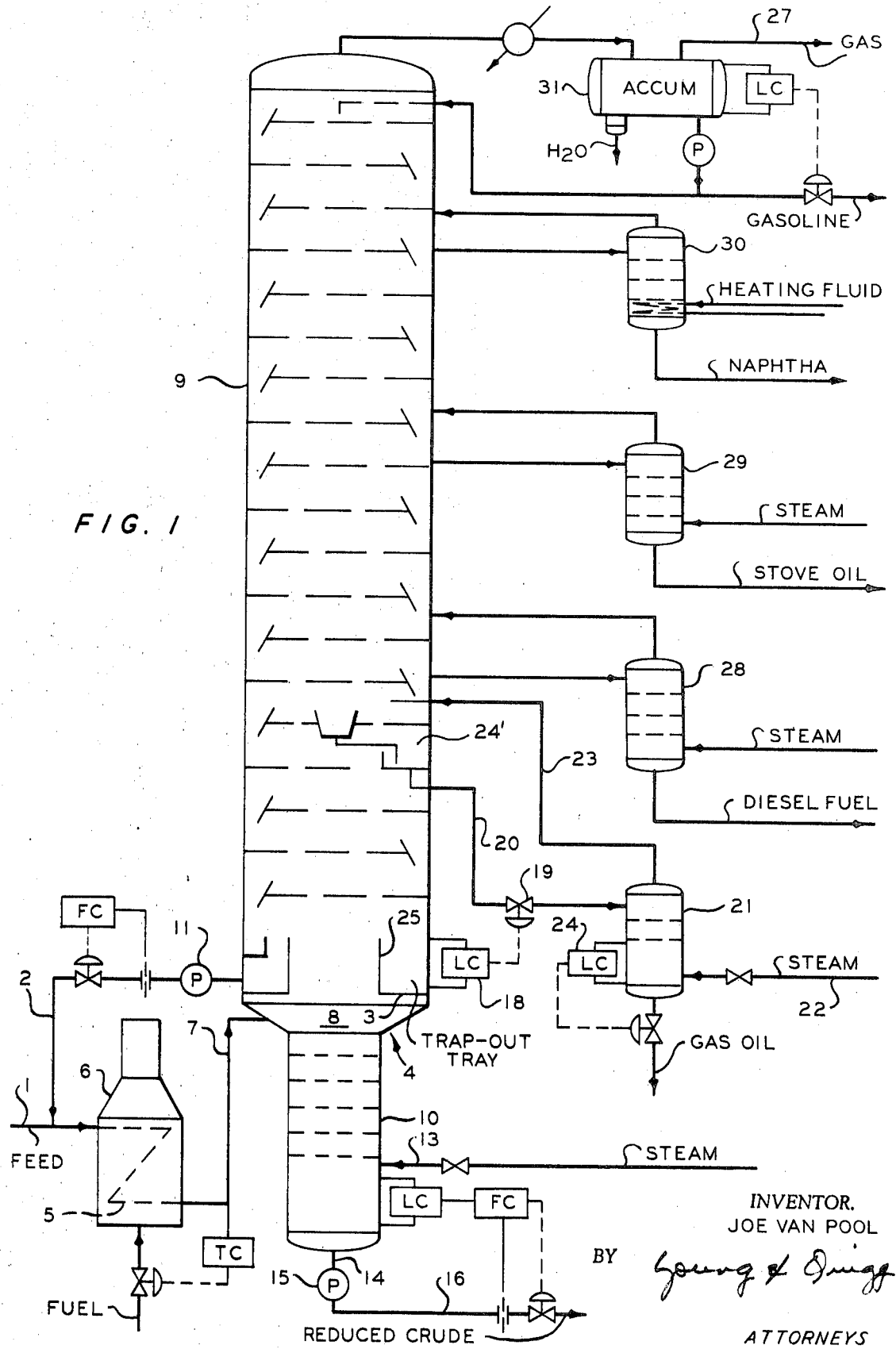

This invention relates to the production of a high flash point reduced crude oil. It also relates to the production of a high flash point specification asphalt. In one of its aspects the invention relates to a distillation operation in which there are operated in a novel manner a fractionation section and a stripping section. In another of its aspects the invention relates to the solvent extraction of a high flash point reduced crude oil produced in a distillation operation as herein described.

According to a concept of the invention it provides a distillation operation in which there are provided a fractionation section and a stripping section, the lower portion of the fractionation section being operated at the highest temperature of those prevailing in the tower, the crude oil being heated to a temperature sufficient that it enters into the distillation intermediate said fractionation section and said stripping section, at least at a temperature substantially that of said lower portion of said fractionation section, gas oil being produced from the operation from a portion of the fractionation section above said lower portion responsive to the liquid level in said lower portion. In another of its concepts the invention provides an operation, as described, wherein a portion of the distillate is taken from the lower portion of said fractionation section, admixed with the crude oil to be distilled and heated together therewith to substantially the highest temperature reached in the overall operation and thus introduced together therewith to said point intermediate said fractionation section and said stripping section. In a further concept of the invention, at least a portion of the distillate which is heated in said lower portion of said fractionation section as by indirect heat exchange. In a further concept of the invention basic thereto, a specification flash point asphalt is produced by solvent extraction as with propane of a high flash point reduced crude oil removed from the bottom portion of the stripping section described.

U.S. Pat. 3,297,566, G. A. Moyer and John T. Cabbage, issued Jan. 10, 1967, describes an operation in which the rate at which a product is withdrawn from a fractionator is controlled by removing a side stream from the fractionator below a point at which the product stream is withdrawn from the fractionator and passing the side stream to a liquid-vapor separator wherein liquid is separated from vapor, and a liquid level is maintained therein, the liquid is passed back to the fractionator at a predetermined rate, the level of liquid is sensed in the liquid-vapor separator and the signal from the liquid level controller is used to adjust the rate at which the product is withdrawn from the fractionator. The disclosure of said patent is incorporated herein by reference. In said patent the liquid which is returned from the separator passes to a locus substantially at the top of the stripping section.

I have now conceived of an operation wherein substantially no distillate is permitted to enter into the stripping section in a distillation operation as herein described. I have conceived that distillate produced in the operation should be maintained in the fractionation section at all times or removed therefrom and this can be accomplished by keeping or maintaining distillate in the lower portion of the fractionation section at a temperature which is substantially at or near the highest temperature in the overall operation.

It is an object of this invention to produce a high flash point reduced crude oil. It is another object of this invention to produce a high flash point specification asphalt. It is a further object of this invention to produce a higher flash point reduced crude oil bottoms product than heretofore obtained, as by operating according to U.S. Pat. 3,297,566, above mentioned. It is a further object of this invention to produce a reduced crude oil with a flash point above about 450° F. It is a further object of this invention to produce a reduced crude oil having a high flash point, for example, above 450° F., without need to subject reduced crude oil to a vacuum distillation. A still further object of the invention is to produce a high flash point reduced crude oil in a distillation operation having a fractionation zone and a stripping zone in which substantially no distillate is allowed to enter into the stripping zone thus reserving the stripping zone entirely for producing the high flash point reduced crude oil.

Another object of this invention is to produce a clean gas oil product by insuring reflux is present in the trays between the gas oil removal tray and the heavy distillate trap-out tray.

Other aspects, concepts, and objects of the invention are apparent from a study of this disclosure, the drawing, and the appended claims.

According to the present invention a high flash point reduced crude oil, suitable upon solvent extraction, as with isobutane, n-butane or a mixture to produce a specification flash point asphalt, is produced according to a concept of design and operation of a fractionation section and a stripping section in a crude oil distillation operation in which no distillate fraction produced is permitted to enter the stripping section, usually operated with stripping steam and in which distillation operation all distillate produced is moved upwardly of the fractionation section at all times except as a portion thereof is utilized according to the invention to adsorb or to carry heat with which to effect the operation of the invention. Thus, no distillate produced can enter the stripping section because according to the invention the distillate in the lower portion of the fractionation section is maintained at the highest temperature maintained in the distillation operation. By operating the distillation in manner more fully described below, the reflux in the fractionation section never enters the stripping section. There is supplied ample distillate to wet the trays in the fractionation section above the introduction of the heated crude oil and the heated recycled distillate to produce, from vapors generated therefrom, a clean gas oil condensate which is removed from the fractionation section at a locus well above the generation of the distillate which is accumulated and used at the locus of highest temperature obtained and maintained in the distillation operation according to the invention.

In another embodiment the control is effected by maintaining a constant heat input in said lower portion and drawing off from the gas oil draw-off tray gas oil responsive to the liquid level in said lower section. Thus, the trays intermediate the hottest portion in the column and the gas oil draw-off tray are constantly suitably wetted with reflux.

The temperature of the oil or distillate in said lower portion of the fractionation section can be variously maintained. In a now preferred embodiment the distillate temperature and, therefore, the temperature of the hottest portion of the operation is maintained by passing at least a portion of the distillate from the tower to a heating zone, heating it to a suitable temperature in said zone and passing it to the lower portion of said fractionation section. In one form of this embodiment the distillate is admixed with the crude oil to be distilled and, therefore, is immediately vaporized therefrom upon entry of the admixture into the distillation zone. Thus, the crude oil and the distillate are preheated to a temperature such that the lower portion of the fractionation section will be maintained at the highest temperature in the overall operation.

In another embodiment of the invention the distillate can be heated in situ in the lower portion of the fractionation section or it may be separately heated elsewhere either in the same heating zone but apart from the crude oil or in a separate heating zone. When it is heated in the fractionation section, it can be heated by suitable heat exchange medium, passing into said section. It is now preferred to pass such a heating medium through coils or other suitable heat exchange structure in the lower portion of the fractionation section.

Thus, according to the invention a crude oil and a distillate fraction are heated to a desired distillation temperature which is the highest in an ensuing distillation operation and are discharged into a distillation zone having a fractionation section and a stripping section, the heated crude oil and the heated distillate being passed into said distillation zone intermediate said sections and unvaporized portion of said crude oil passing downwardly into and through said stripping section, there being withdrawn from the bottom of the stripping section a high flash point reduced crude oil; there being maintained in the lower portion of said fractionation section a body of distillate, the level of which is controlled by its draw-off of a gas oil from a portion of the fractionation section thereabove, the rate of draw-off being in any event responsive to the level of distillate in said lower portion which is thus maintained substantially constant, thus maintaining sufficient reflux between said lower portion and said gas oil draw-off while avoiding the entry of any distillate, generated or recycled, into the stripping zone; fractions lower boiling than said gas oil being taken off from the fractionation section at loci above said gas oil draw-off, as one skilled in the art in possession of this disclosure having studied the same will clearly understand.

The high flash reduced crude thus produced is then subjected to solvent extraction as in a propane extraction to produce, in known manner, a high flash point asphalt.

Figure 2:
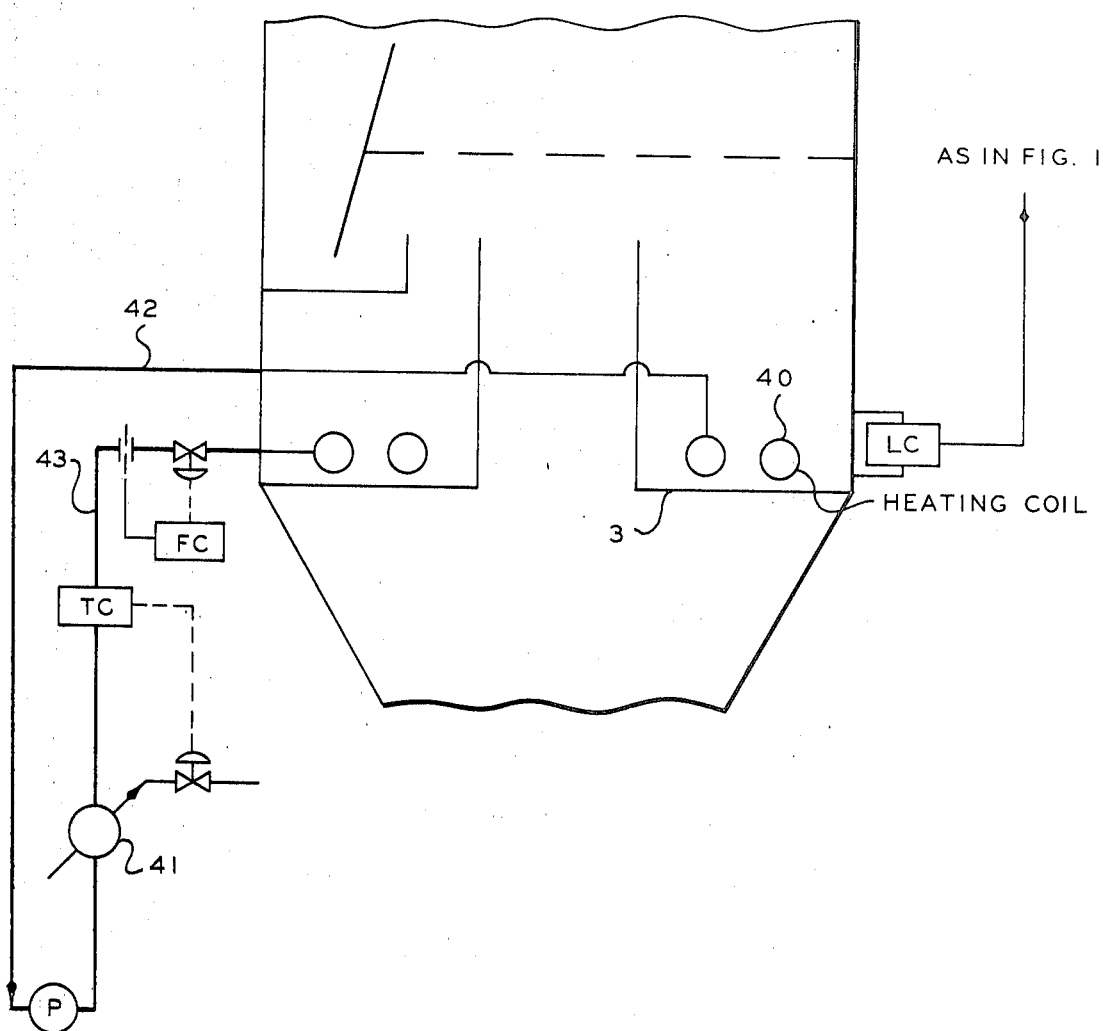

FIG. 1 of the drawing shows diagrammatically a flow pattern according to the invention in which the distillate is removed from a trap-out tray in the lower portion of the fractionation section and is admixed and heated together with the crude feed. FIG. 2 shows a modification in which the distillate oil in the lower portion of the fractionation section is heated in situ by a heating medium, passed into indirect heat exchange therewith.

Referring now to FIG. 1 of the drawing. A crude feed 1 is admixed with distillate 2 taken from trap-out tray 3 in distillation column 4 passed through coil 5 in heater 6 and discharged therefrom by 7 at a temperature 700° F. into intermediate section 8 positioned between fractionation section 9 and stripping section 10 of column 4. It is convenient to refer to trays relating them to their respective functions. Oil in trap-out tray 3 is at 690° F. and, therefore, only 10° cooler than that entering intermediate section 8. The rate of cycling of oil from trap-out tray 3 by way of pump 11 and pipe 2 through coil 5 and pipe 7 back to intermediate section 8 is adjusted so as to maintain desired reflux between the trap-out tray 3 and tray 24'. A temperature control sensing temperature just before discharge of the heated oil or mixture into section 8 produces a signal responsive to which fuel to heater 6 is controlled, in order to produce the desired temperature of the feed entering via line 7.

Steam is introduced by 13 into stripping section 10 and a reduced crude is withdrawn at 14 and pumped by pump 15 and passed by 16 to solvent deasphalting to produce the high flash point asphalt according to the invention. The distillation and stripping operation here described is conducted substantially at atmospheric pressure. The reduced crude produced need not be vacuum distilled to give it the desired flash point of at least 450° F.

Upon entry into section 8 of the tower 4, the crude oil is flashed. Any distillate contained therein will also flash or vaporize and pass upwardly into fractionation section 9. As vapors encounter downcoming reflux, heat exchange will occur, condensate will be produced, and accumulated in trap-out tray 3. The level in trap-out tray 3 is controlled by means of liquid level controller 18 operatively connected to gas oil draw-off valve 19 which permits gas oil to pass by 20 into gas oil stripper 21 in which lighter ends are stripped from the gas oil by steam introduced at 22. These lighter ends pass by 23 into the fractionation section while gas oil is drawn off responsive to liquid level control by 24. This gas oil is suitable as a feedstock for catalytic cracking. By means of liquid level control 18 and valve 19, gas oil is drawn off from gas oil trap-out or draw-off tray 24 at a rate sufficient to provide the desired reflux in the gas oil section of the tower to produce clean gas oil and liquid flow on the trays below the gas oil withdrawal to eliminate coke formation and accumulation on these trays, and avoiding accumulation of distillate in trap-out tray 3 in order to avoid overflow of chimney 25 and, therefore, entry of distillate into stripping section 10. According to the invention the temperature and flow rates which have been discussed are correlated and can be adjusted to reach the desired combination of operational steps.

The upper section of fractionation section 9, as shown, is arranged to produce respectively, a diesel fuel, a stove oil, a naphtha and a gasoline, gas being released from the operation at 27. One skilled in the art in possession of this disclosure having studied the same will understand the respective operations of side towers 28, 29 and 30 and accumulator 31. In this operation a tower bottom temperature of 675° F. and a tower top temperature of 233° F. is maintained and 17,500 barrels per day of crude feed, essentially a mixture of Rangely, Red Wash and other crudes of API 32 are fed to heater 6. Approximately 1,000 barrels per day are pumped from trap-out tray 3 into admixture with the crude feed before it passes through heater 6. There are produced approximately 3,500 barrels per day of a reduced crude having an API gravity of 18 and a COC[1] flash of 500° F.

Referring now to FIG. 2. Trap-out tray 3 is provided with heating coil 40 to which a heating medium such as Dowtherm is passed, heated to a temperature of about 750° F. by means of heater 41 and cycled through pipes 42 and 43, which are suitably equipped with temperature control sensing means operative to adjust flow of heating medium through heater 41 and flow control means to control the flow of the heated heating medium. It is within the scope of the invention to operate as heretofore described without the embodiment of FIG. 2. It is also within the scope of the invention to operate only embodiment according to FIG. 2. Further, it is possible within the scope of the invention to supply a portion of the heat required in tray 3 by means of the FIG. 2 embodiment.

In the following tabulation are given ranges of operating conditions which can be applied, depending upon the nature of the crude oil or crude oil mixture treated, the flash point of the reduced crude sought to be obtained and other variables which one skilled in the art in possession of this disclosure having studied the same will, of course, consider routinely.

SPECIFIC EXAMPLE

Tabulation

Distillation column:
  Top temperature, ° F. _____ 233
  Trap-out tray (3) Temp., ° F. _____ 690
  Bottom temp., ° F. _____ 675
  Feed plus distillate recycle (7), ° F. _____ 700
  Pressure, p.s.i.g. _____ 15

Crude oil feed (1):
  (Mixture Rangely and Red Wash)
    ° API at 60° F. _____ 32
    Barrels/day _____ 17,500

Distillate recycle (2):
  ° API at 60° F. _____ 21
  Barrels/day _____ 1,000

Reduced crude (16):
  ° API at 60° F. _____ 18
  COC flash, ° F. _____ 500
  Barrels/day _____ 3,500

Steam (13):
  Temperature, ° F. _____ 650
  Pounds/hour _____ 3,500

Asphalt product (not shown) after conventional propane deasphalting:
  ° API at 60° F. _____ 10.5
  COC flash, ° F. _____ 500
  Penetration (100 gms., 5 sec. 77° F.) _____ 87
  Barrels/day _____ 1,250

Although in the specific example presented in describing the figures referred to specific crude oil, the invention is not limited to these crude oils. Other asphaltic crudes can be used, of course, as is known to those skilled in this art. Among the numerous crudes, for example, which can be used in my invention, and I do not intend this to be limiting, are Western Kansas crude, West Texas crude, Bridger Lake, Patrick Draw, Walker Hollow, Wyoming "U," Escalante, Wonsit and others.

Also, I have selected 450° F. as the minimum flash point. This is not necessarily limiting. The selected flash point depends upon the specification called for on the produced asphalt. According to a feature of the invention, my tower is operated to produce a flash point on the reduced crude so that no vacuum distillation is required to increase the flash point thereof. That is, I produce a high enough flash point on the reduced crude from the tower so that I can pass the reduced crude to solvent refining (without vacuum distillation) to recover an asphalt having the desired preselected high flash point. Also I have used propane as the solvent to recover the asphalt from reduced crude. I do not intend to be limited to propane. As is known in the art, there are numerous conventional solvents for recovering asphalt from asphalt-containing oil. Such conventional solvents include propane, isobutane, n-butane, isopentane or mixtures thereof, and other known solvents, e.g., phenol, furfural, sulfolane for other than crude oil feed. During solvent extraction or deasphalting, I recover the asphalt product and also a heavy gas oil, which gas oil is suitable for various uses, e.g., as charge to lube oil manufacturing, as is known in the art.

Asphalts (or asphalt cements) in commercial use for road surfacing, cut backs, emulsions, etc. have usually a minimum allowable flash point specification. These flash points, of course, vary from specification to specification. The example of 450° F. minimum is not to be limiting. Also, asphalts produced are in several penetration ranges, as is known in the art. In my invention, the desired penetration range is produced by controlling the depth of solvent extraction or deasphalting as well as the depth of fractionation in my distillation zone or by fluxing the solvent deasphalter yield with separately prepared flux oil of the desired properties.

In my example I have used 690° F. on trap-out tray 3. This is not to be a limiting temperature. This temperature can be routinely determined and depends upon the flash point or depth of fractionation desired. It is limited at its upper end, however, to the extent that cracking temperatures are not now desired, e.g., above about 750° F. or so, again depending upon the specific crude oil being processed.

Reasonable variation and modification are possible within the scope of the foregoing disclosure, drawing and the appended claims to the invention the essence of which is that there has been provided an operation for the distillation of a crude oil to produce a high flash point reduced crude oil wherein a crude oil charge is introduced to a distillation operation provided with a fractionation section and a stripping section, the crude oil being introduced intermediate said sections and at a temperature which is the highest temperature in the overall operation and there is also heated, preferably together with the crude oil charge, a distillate formed in said fractionation section so as to maintain the lower portion of said fractionation section at a temperature which is the highest temperature maintained in the operation or is at least higher than any other temperature in the distillation zone so as to avoid entry of any distillate or reflux into the stripping section while producing from the fractionation section gas oil responsive to liquid level and/or temperature control of said lower portion of said fractionation section.

I claim:
1. A method for the distillation of a crude oil which comprises heating a crude oil and a distillate fraction produced during an ensuing distillation operation to a desired distillation temperature which is the highest in an ensuing distillation operation and discharging the thus heated crude oil and the thus heated distillate fraction into a distillation zone having a fractionation section and a stripping section, the heated crude oil and the heated distillate being passed into said distillation zone into a section intermediate said sections, an unvaporized portion of said crude oil passing downwardly into and through said stripping section, there being withdrawn from the bottom of the stripping section a high flash reduced crude oil; there being maintained in the lower portion of said fractionation section a body of distillate, the level of which is controlled by its temperature or by draw-off of a gas oil from a portion of the fractionation

---
[1] Cleveland Open Cup Flash Point.

section thereabove, the rate of draw-off being in any event responsive to the level of distillate in said lower portion which is thus maintained substantially constant, thus maintaining sufficient reflux between said lower portion and said gas oil draw-off while avoiding the entry of any substantial amount of distillate, generated or recycled, into the stripping zone; fractions lower boiling than said gas oil being taken off from the fractionation section at loci above said gas oil draw-off.

2. A method according to claim 1 which comprises fractionating in a fractionation zone having a steam stripping section and a fractionation section above said steam stripping section, a crude oil to produce a high flash point reduced crude oil which upon suitable solvent extraction, as with propane, will produce a specification flash product asphalt and which is removed from a locus in the bottom of said zone, which comprises preheating an admixture of said crude oil and a subsequently produced distillate fraction to produce a preheated crude oil at a temperature higher than any temperature retained in the fractionation zone to partially vaporize said crude oil and to substantially completely vaporize said distillate, passing said admixture to said fractionation zone at a locus above the steam stripping section but below said fractionation section, and the removal locus of said subsequently produced distillate fraction; passing the non-vaporized portion of the crude oil to the upper portion of said steam stripping section; passing stripping steam to a lower portion of said steam stripping section to a locus therein above the removal locus of said high flash point reduced crude oil; passing vapors generated in said steam stripping section along with said stripping steam and the vapors produced from the crude oil to said fractionation section to produce a distillate fraction feed at a locus in said fractionation section; and recovering a high boiling distillate from said fractionation section as the subsequently produced distillate fraction earlier employed herein.

3. A method according to claim 1 wherein distillate in the lower portion of the fractionation section is heated in situ to a temperature which is sufficiently high to avoid entry of distillate in any substantial amount into the stripping section.

4. An apparatus which comprises a distillation vessel having an upper fractionation section and a lower stripping section, a trap-out tray in the lower portion of said fractionation section, means for passing feed to and through a provided heating means into a section provided intermediate said fractionation section and said stripping section, means in said trap-out tray for heating distillate therein and maintaining the same as the hottest portion of the tower, and means for removing liquid from said tray and combining the same with said feed.

References Cited
UNITED STATES PATENTS

| | | | |
|---|---|---|---|
| 1,418,885 | 6/1922 | Schulze | 203—98 |
| 2,319,750 | 5/1943 | Schonberg et al. | 208—358 |
| 3,297,566 | 1/1967 | Moyer et al. | 208—355 |
| 3,301,778 | 1/1967 | Cabbage | 208—356 |
| 3,310,487 | 3/1967 | Johnson et al. | 208—355 |
| 3,365,386 | 1/1968 | Van Pool | 208—355 |
| 3,412,016 | 11/1968 | Graven | 208—355 |

HERBERT LEVINE, Primary Examiner

U.S. Cl. X.R.

196—99, 102, 120; 202—153, 181; 208—354, 356